United States Patent
Chen et al.

(10) Patent No.: US 8,648,972 B2
(45) Date of Patent: Feb. 11, 2014

(54) SWITCHABLE TWO DIMENSIONAL / THREE DIMENSIONAL DISPLAY (2D/3D DISPLAY) COMPRISING A SWITCHABLE BARRIER HAVING A THREE DIMENSIONAL IMAGE CONTROL AREA AND A FIRST BLACK MATRIX AND A SECOND BLACK MATRIX THAT SURROUNDS THE THREE DIMENSIONAL IMAGE CONTROL AREA

(71) Applicant: Au Optronics Corporation, Hsinchu (TW)

(72) Inventors: Chao-Yuan Chen, Hsinchu County (TW); Jenn-Jia Su, Chiayi County (TW); Ting-Jui Chang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/924,638

(22) Filed: Jun. 24, 2013

(65) Prior Publication Data
US 2013/0278848 A1    Oct. 24, 2013

Related U.S. Application Data

(62) Division of application No. 13/353,302, filed on Jan. 18, 2012, now Pat. No. 8,493,521, which is a division of application No. 12/326,909, filed on Dec. 3, 2008, now Pat. No. 8,144,273.

(30) Foreign Application Priority Data

Oct. 9, 2008 (TW) ............................... 97138935 A

(51) Int. Cl.
G02F 1/1335 (2006.01)
G02F 1/1333 (2006.01)
G09G 5/00 (2006.01)
G02B 27/22 (2006.01)

(52) U.S. Cl.
USPC .................. 349/15; 349/110; 359/462; 345/6

(58) Field of Classification Search
USPC ........................ 349/15, 110–111; 348/42–60; 345/4–96; 359/462–477
See application file for complete search history.

(56) References Cited

U.S. PATENT DOCUMENTS

| | | | |
|---|---|---|---|
| 2004/0257531 A1* | 12/2004 | Hattori et al. | 353/10 |
| 2007/0035672 A1* | 2/2007 | Shestak et al. | 349/15 |
| 2007/0171193 A1* | 7/2007 | Nakamura | 345/156 |
| 2007/0229654 A1* | 10/2007 | Kusuno | 348/51 |

* cited by examiner

Primary Examiner — Paul Lee
(74) Attorney, Agent, or Firm — Jianq Chyun IP Office

(57) ABSTRACT

A switchable two dimensional/three dimensional display (2D/3D display) suitable for being viewed by a user is provided. The switchable 2D/3D display includes a liquid crystal display (LCD) panel and a switchable barrier which are overlapped with each other. The LCD panel has a display area, a non-display area surrounding the display area, and a first black matrix extending from the display area to the non-display area. The first black matrix has a plurality of openings arranged in array and merely distributed within the display area. The switchable barrier has a 3D image control area, a non-display area surrounding the 3D image control area, and a second black matrix merely disposed within the non-display area. The second black matrix surrounds the 3D image control area. An area occupied by the 3D image control area is different from an area occupied by the display area.

5 Claims, 4 Drawing Sheets

SWITCHABLE TWO DIMENSIONAL / THREE DIMENSIONAL DISPLAY (2D/3D DISPLAY) COMPRISING A SWITCHABLE BARRIER HAVING A THREE DIMENSIONAL IMAGE CONTROL AREA AND A FIRST BLACK MATRIX AND A SECOND BLACK MATRIX THAT SURROUNDS THE THREE DIMENSIONAL IMAGE CONTROL AREA

CROSS-REFERENCE TO RELATED APPLICATION

This is a divisional application of and claims the priority benefit of U.S. application Ser. No. 13/353,302, filed on Jan. 18, 2012, now allowed. The prior U.S. application Ser. No. 13/353,302 is a divisional application of and claims the priority benefit of U.S. application Ser. No. 12/326,909, filed on Dec. 3, 2008, U.S. Pat. No. 8,144,273, which claims the priority benefit of Taiwan application serial no. 97138935, filed on Oct. 9, 2008. The entirety of each of the above-mentioned patent applications is hereby incorporated by reference herein and made a part of this specification.

BACKGROUND OF THE INVENTION

1. Field of the Invention

The present invention relates to a switchable two dimensional/three dimensional display (2D/3D display), and more particularly to a switchable 2D/3D display equipped with a switchable barrier.

2. Description of Related Art

In recent years, continuous advancement of display technologies results in increasing demands on display quality of displays, such as image resolution, color saturation, and so on. Nevertheless, in process of purchasing a display, whether the display is able to display 3D images or not is also taken into consideration in addition to high image resolution and high color saturation.

In current 3D image display technologies, a fixed barrier is mainly utilized for controlling images captured in respective eyes of a viewer. However, according to visual characteristics of human eyes, a 3D image may be produced when two images with the same content but different parallax are respectively captured by a viewer's left and right eyes. Based on different positions of the fixed barrier, the 3D image display technologies can be approximately categorized into a front barrier 3D image display technology and a back barrier 3D image display technology.

In the front barrier 3D image display technology, the barrier is disposed in front of a display panel, i.e., the barrier is located between the display panel and human eyes. By contrast, in the back barrier 3D image display technology, the barrier is disposed between a backlight source and the display panel. The front barrier 3D image display technology is further detailed in US publication number 2004/0257531, while the back barrier 3D image display technology is described in US publication number 2007/0229654 A1.

It should be noted that a 3D image is produced by means of the fixed barrier in a spatial-multiplexed manner, whereby the resolution of a 3D display device is reduced in half even though a 3D display effect of a liquid crystal display (LCD) panel can be achieved. Besides, the 3D display equipped with the fixed barrier cannot be used to display 2D images but 3D images. Thus, the 3D display having the fixed barrier cannot be extensively applied.

To resolve said issue, a switchable barrier has been proposed and applied in a switchable 2D/3D display such that the switchable 2D/3D display is able to display 2D images when the switchable barrier is turned off. By contrast, when the switchable barrier is turned on, the switchable 2D/3D display is able to display 3D images.

FIG. 1 is a schematic cross-sectional view of a conventional switchable 2D/3D display. Referring to FIG. 1, a conventional switchable 2D/3D display 100 includes an LCD panel 110 and a switchable barrier 120. The LCD panel 110 has a display area 110a, a non-display area 110b surrounding the display area 110a, and a first black matrix 112 extending from the display area 110a to the non-display area 110b. The first black matrix 112 has a plurality of openings 112a arranged in array and merely distributed within the display area 110a. The switchable barrier 120 has a 3D image control area 120a, a non-display area 120b surrounding the 3D image control area 120a, and a second black matrix 122 merely disposed within the non-display area 120b. The second black matrix 122 surrounds the 3D image control area 120a, and an area occupied by the 3D image control area 120a is the same as an area occupied by the display area 110a. In other words, the area of the non-display area 120b is the same as the area of the non-display area 110b.

It can be deduced from FIG. 1 that an outer edge of the 3D image control area 120a is aligned to an outer edge of the display area 110a. Hence, when the conventional switchable 2D/3D display 100 is used, it is rather perceivable that the images do not present a favorable visual effect on the edges of the images. In particular, the second black matrix 122 is not likely to completely block the viewer from visually perceiving the first black matrix 112 located on the edges of the images.

SUMMARY OF THE INVENTION

The present invention is directed to a switchable 2D/3D display which can display images with favorable visual effects on edges thereof.

In the present invention, a switchable 2D/3D display viewed by a user includes an LCD panel and a switchable barrier. The LCD panel has a display area, a non-display area surrounding the display area, and a first black matrix extending from the display area to the non-display area. The first black matrix has a plurality of openings arranged in array and merely distributed within the display area. The switchable barrier has a 3D image control area, a non-display area surrounding the 3D image control area, and a second black matrix merely disposed within the non-display area. The second black matrix surrounds the 3D image control area. An area occupied by the 3D image control area is different from an area occupied by the display area. The liquid crystal display panel and the switchable barrier are overlapped with each other.

In an embodiment of the present invention, the area occupied by the three dimensional image control area is smaller than the area occupied by the display area.

In an embodiment of the present invention, the second black matrix is located above the non-display area and a portion of the display area.

In an embodiment of the present invention, the second black matrix located above the portion of the display area has a width $W_1$, and a minimum distance between the first black matrix and the second black matrix is $D_1$, wherein $W_1/D_1 \geq W_H/D_H$.

Here, $W_H$ is half of a width of the display area. $D_H$ is a predetermined viewing distance substantially identical to a distance from eyes of the user to an inner surface of one substrate in the LCD panel.

In an embodiment of the present invention, the liquid crystal display panel is disposed below the switchable barrier.

In an embodiment of the present invention, the switchable 2D/3D display further includes a backlight module, and the LCD panel is interposed between the switchable barrier and the backlight module.

In the switchable 2D/3D display of the present invention, the switchable barrier has a first control electrode located in the three dimensional image control area, and the first control electrode has a plurality of openings.

In the switchable 2D/3D display of the present invention, the second black matrix is not disposed in the three dimensional image control area of the switchable barrier.

To make the above and other features and advantages of the present invention more comprehensible, several embodiments accompanied with figures are detailed as follows.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
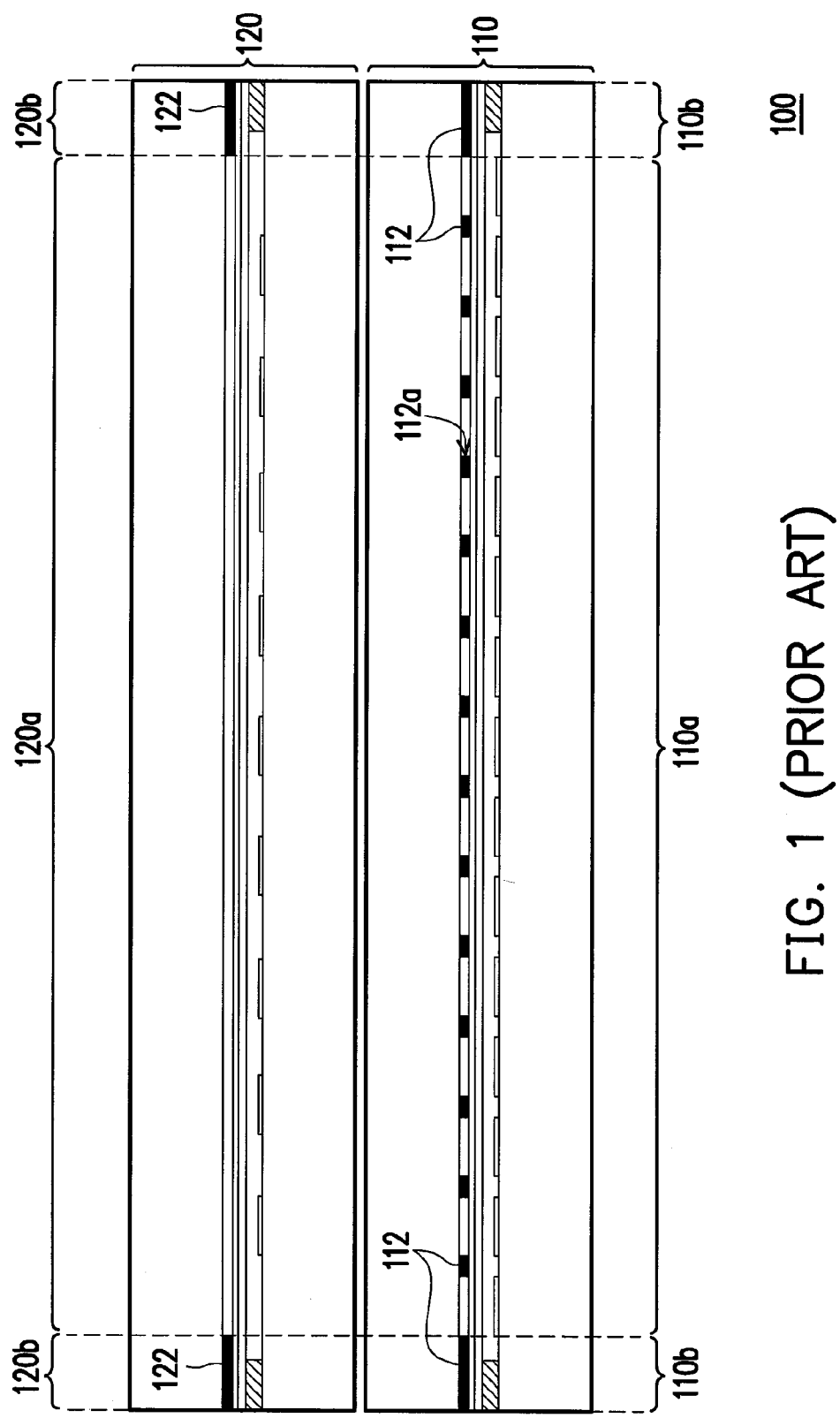
FIG. 1 is a schematic cross-sectional view of a conventional switchable 2D/3D display.
Figure 2:
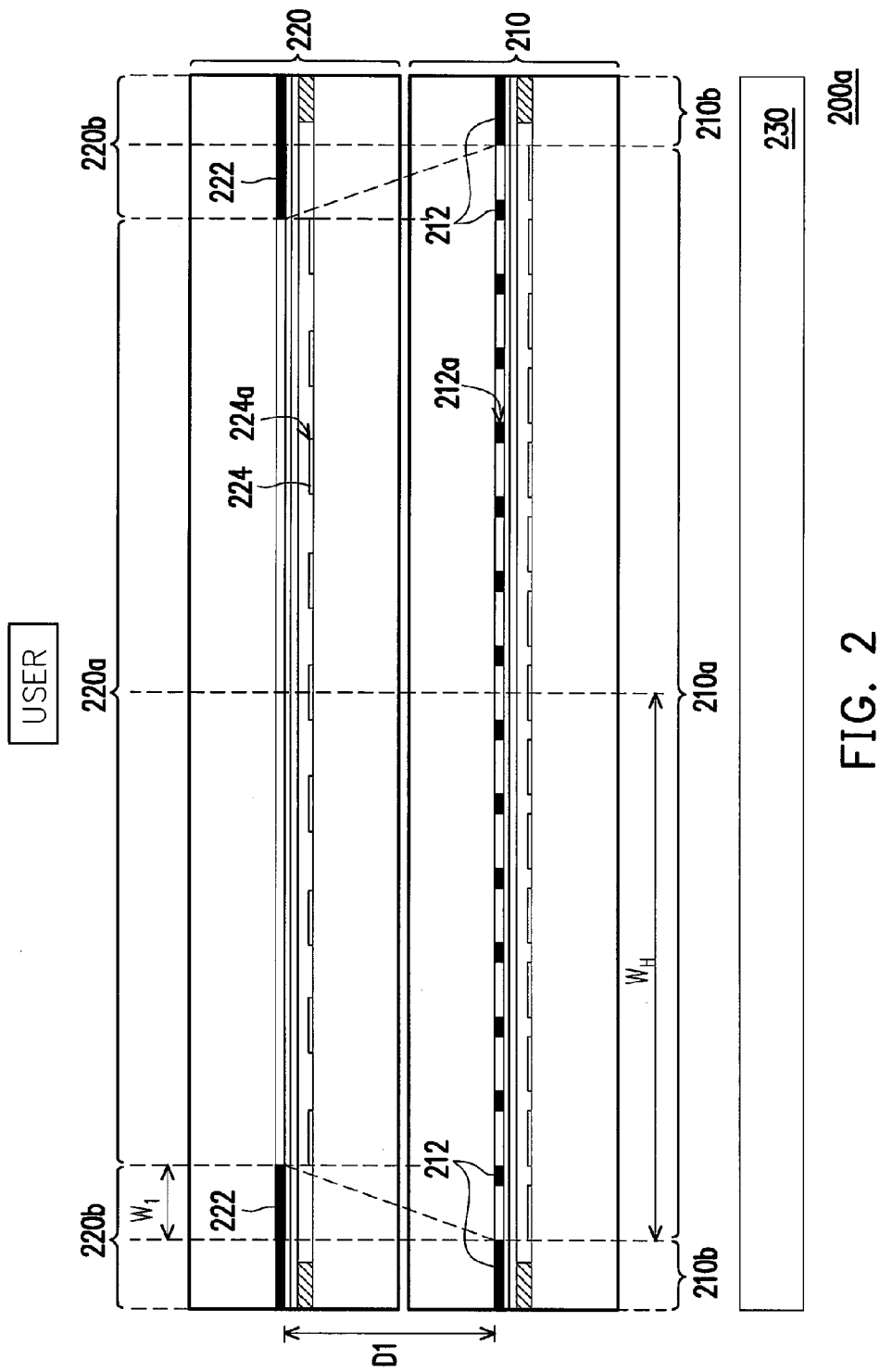
FIG. 2 is a schematic cross-sectional view of a switchable 2D/3D display according to an embodiment of the present invention.

FIG. 2 is a schematic cross-sectional view of a switchable 2D/3D display according to an embodiment of the present invention. Referring to FIG. 2, a switchable 2D/3D display 200a of the present embodiment is suitable for being viewed by a user. The switchable 2D/3D display 200a includes an LCD panel 210 and a switchable barrier 220. The LCD panel 210 has a display area 210a, a non-display area 210b surrounding the display area 210a, and a first black matrix 212 extending from the display area 210a to the non-display area 210b. The first black matrix 212 has a plurality of openings 212a arranged in array and merely (or namely only) distributed within the display area 210a. The switchable barrier 220 has a 3D image control area 220a, a non-display area 220b surrounding the 3D image control area 220a, and a second black matrix 222 merely (or namely only) disposed within the non-display area 220b. The second black matrix 222 surrounds the 3D image control area 220a, and an area occupied by the 3D image control area 220a is substantially different from an area occupied by the non-display area 220b. As shown in FIG. 2, the switchable barrier 220 of the present embodiment is interposed between the LCD panel 210 and the user, and an area occupied by the 3D image control area 220a is substantially smaller than an area occupied by the display area 210a. Specifically, the second black matrix 222 in the switchable barrier 220 is located above the non-display area 210b and a portion of the display area 210a. In addition, the second black matrix 222 is partially overlapped with the first black matrix 212 and extends inwardly from an edge of the second black matrix 220 with a predetermined width. Namely, an inner edge of the second black matrix 222 and an inner edge of the first black matrix 212 are not substantially aligned to each other.

According to the present embodiment, the second black matrix 222 is apt to block the user (or namely viewer) from visually perceiving the first black matrix 212 located on edges of images. Thereby, unfavorable visual effects occurring on the edges of the images can be prevented.

In the present embodiment, the LCD panel 210 is, for example, a twisted nematic LCD panel, and the switchable barrier 220 is, for example, a normally white mode TN-LC cell. Particularly, the LCD panel 210 can either be the twisted nematic LCD panel or any other LCD panel, such as a multi-domain vertically aligned (MVA) LCD panel, and so on. The switchable barrier 220 has a first control electrode 224 located within the 3D image control area 220a, and the first control electrode 224 has a plurality of openings 224a.

Moreover, the switchable 2D/3D display 200a of the present embodiment can further include a backlight module 230, and the LCD panel 210 is interposed between the switchable barrier 220 and the backlight module 230.

In the present embodiment, the second black matrix 222 located above the portion of the display area 210a has a width $W_1$, and a minimum distance between the first black matrix 212 and the second black matrix 222 is $D_1$, wherein $$W_1/D_1 \geq W_H/D_H.$$

Here, $W_H$ is about (or namely approximately) half of a width of the 3D image control area 210a. $D_H$ is a predetermined viewing distance substantially identical to a distance from eyes of the user to an inner surface of one substrate in the LCD panel 210. Positions of the user are merely exemplary in the present embodiment. Besides, the insignificant thickness of a liquid crystal layer in the LCD panel 210 can be disregarded in the present embodiment. In general, when the switchable 2D/3D display 200a is used on a monitor, the predetermined viewing distance $D_H$ ranges from about 50 cm to about 100 cm, for example. Given that the switchable 2D/3D display 200a is applied in a TV set, the predetermined viewing distance $D_H$ ranges from about 300 cm to about 500 cm, for example. It is certain that the switchable 2D/3D display 200a of the present embodiment can be applied in other fields, and the predetermined viewing distance $D_H$ can be accordingly adjusted based on actual demands.

Figure 3:
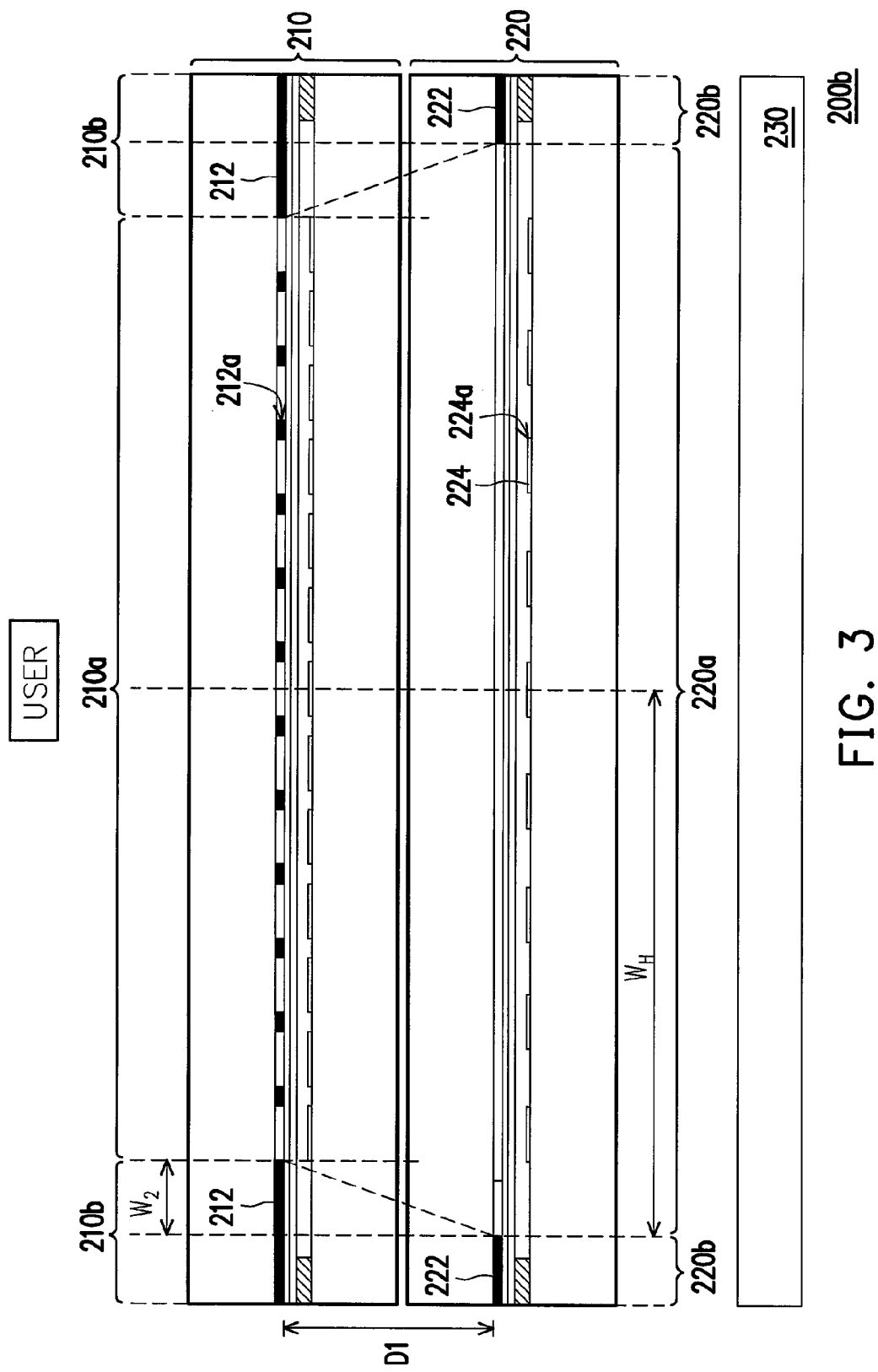
FIG. 3 is a schematic cross-sectional view of a switchable 2D/3D display according to another embodiment of the present invention.

FIG. 3 is a schematic cross-sectional view of a switchable 2D/3D display according to another embodiment of the present invention. As shown in FIG. 3, a switchable 2D/3D display 200b of the present embodiment is similar to the 2D/3D display 200a depicted in FIG. 2, while the difference therebetween lies in that the LCD panel 210 in the switchable 2D/3D display 200b is interposed between the switchable barrier 220 and the user (or namely viewer). Additionally, the area occupied by the display area 210a is substantially smaller than the area occupied by the 3D image control area 220a. In detail, the first black matrix 212 is located above the non-display area 220b and a portion of the 3D image control area 220a.

According to the present embodiment, the first black matrix 212 is apt to block the user (or namely viewer) from visually perceiving the second black matrix 222 located on edges of images. Thereby, unfavorable visual effects occurring on the edges of the images can be prevented.

In an embodiment of the present invention, the first black matrix 212 located above the portion of the 3D image control area 220a has a width $W_2$, and a minimum distance between the first black matrix 212 and the second black matrix 222 is $D_1$, wherein $W_2/D_1 \geq W_H/D_H$.

Here, $W_H$ is about (or namely approximately) half of a width of the 3D image control area 220a. $D_H$ is a predetermined viewing distance substantially identical to a distance from eyes of the user to an inner surface of one substrate in the switchable barrier 220. Positions of the user are merely exemplary in the present embodiment. Besides, the insignificant thickness of a liquid crystal layer in the switchable barrier 220 is disregarded in the present embodiment. In general, when the switchable 2D/3D display 200b is used on a monitor, the predetermined viewing distance $D_H$ ranges from about 50 cm to about 100 cm, for example. Given that the switchable 2D/3D display 200b is applied in a TV set, the predetermined viewing distance $D_H$ ranges from about 300 cm to about 500 cm, for example. It is certain that the switchable 2D/3D display 200b of the present embodiment can be applied in other fields, and the predetermined viewing distance $D_H$ can be accordingly adjusted based on actual demands.

Figure 4:
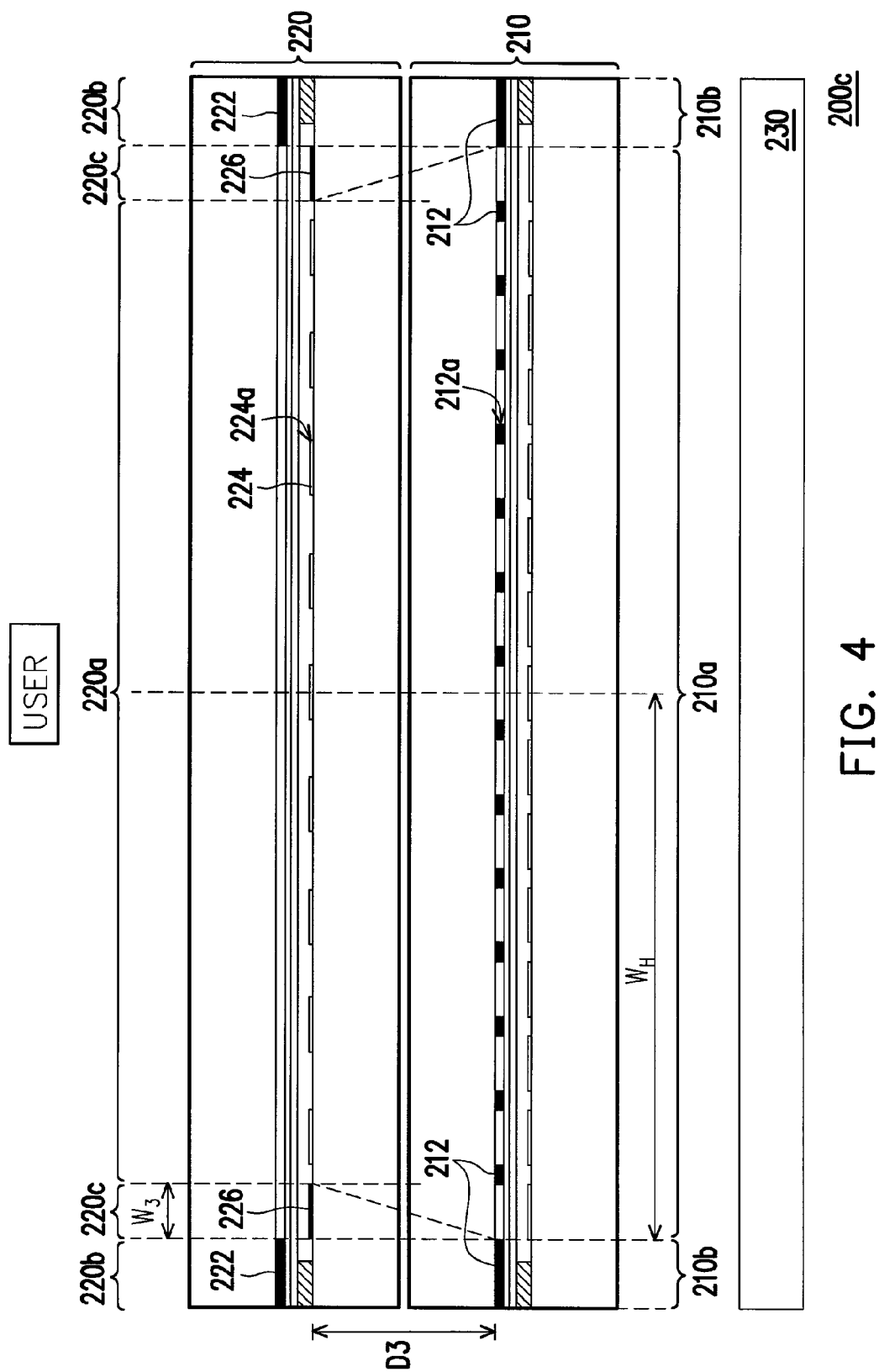
FIG. 4 is a schematic cross-sectional view of a switchable 2D/3D display according to still another embodiment of the present invention.

FIG. 4 is a schematic cross-sectional view of a switchable 2D/3D display according to still another embodiment of the present invention. Referring to FIG. 4, a switchable 2D/3D display 200c of the present embodiment includes an LCD panel 210 and a switchable barrier 220. The LCD panel 210 has a display area 210a, a non-display area 210b surrounding the display area 210a, and a first black matrix 212 extending from the display area 210a to the non-display area 210b. The first black matrix 212 has a plurality of openings 212a arranged in array and merely (or namely only) distributed within the display area 210a. The switchable barrier 220 is interposed between the LCD panel 210 and the user (or namely viewer). Besides, the switchable barrier 220 has a 3D image control area 220a, a switchable shielding area 220c surrounding the 3D image control area 220a, a non-display area 220b surrounding the switchable shielding area 220c, and a second black matrix 222 merely (or namely only) disposed within the non-display area 220b. An area occupied by the 3D image control area 220a is substantially smaller than an area occupied by the display area 210a. Detailed structures of the LCD panel 210 and the switchable barrier 220 are the same as those provided in the previous embodiments, and thus no further description is provided herein.

It should be noted that the switchable barrier 220 of the present embodiment has a first control electrode 224 located in the 3D image control area 220a and a second control electrode 226 located in the switchable shielding area 220c, and the first control electrode 224 has a plurality of openings 224a. In a preferred embodiment, the second control electrode 226 is a ring-shaped electrode and may be has not any openings, for example.

As indicated in FIG. 4, the area occupied by the display area 210a is substantially equal to a total area occupied by the 3D image control area 220a and the switchable shielding area 220c. Besides, an inner edge of the non-display area 210b of the LCD panel 210 and an inner edge of the non-display area 220b of the switchable barrier 220 are substantially aligned to each other, and the switchable shielding area 220c is located above a portion of the display area 210a.

In the present embodiment, the switchable shielding area 220c has a width $W_3$, and a minimum distance between the first black matrix 212 and the switchable shielding area 220c is $D_3$, wherein $W_3/D_3 \geq W_H/D_H$.

Here, $W_H$ is about (or namely approximately) half of a width of the display area 210a. $D_H$ is a predetermined viewing distance substantially identical to a distance from eyes of the user to an inner surface of one substrate in the LCD panel 210.

In the switchable 2D/3D display of the present invention, the area occupied by the 3D image control area in the switchable barrier is substantially different from the area occupied by the display area in the LCD panel. Hence, the unfavorable visual effects occurring on edges of images displayed on the switchable 2D/3D display of the present invention can be prevented.

Although the present invention has been disclosed by the above embodiments, they are not intended to limit the present invention. Anybody skilled in the art may make some modifications and alterations without departing from the spirit and scope of the present invention. Therefore, the protection range of the present invention falls in the appended claims.

What is claimed is:

1. A switchable two dimensional/three dimensional display (2D/3D display), suitable for being viewed by a user, the switchable 2D/3D display comprising:
a liquid crystal display panel having a display area, a non-display area surrounding the display area, and a first black matrix extending from the display area to the non-display area, wherein the first black matrix has a plurality of openings arranged in array and merely distributed within the display area; and
a switchable barrier having a three dimensional image control area, a non-display area surrounding the three dimensional image control area, and a second black matrix merely disposed within the non-display area, wherein the second black matrix surrounds the three dimensional image control area, an area occupied by the three dimensional image control area is different from an area occupied by the display area, and the liquid crystal display panel and the switchable barrier are overlapped with each other,
wherein the area occupied by the three dimensional image control area is smaller than the area occupied by the display area,
wherein the second black matrix is located above the non-display area and a portion of the display area,
the second black matrix located above the portion of the display area having a width $W_1$, a minimum distance between the first black matrix and the second black matrix being $D_1$, wherein $W_1/D_1 \geq W_H/D_H$, $W_H$ being half of a width of the display area, $D_H$ being a predetermined viewing distance from 50 cm to 100 cm or from 300 cm to 500 cm.

2. The switchable 2D/3D display of claim 1, wherein the liquid crystal display panel is disposed below the switchable barrier.

3. The switchable 2D/3D display of claim 1, further comprising a backlight module, wherein the liquid crystal display panel is interposed between the switchable barrier and the backlight module.

4. The switchable 2D/3D display of claim 1, wherein the switchable barrier has a first control electrode located in the three dimensional image control area, and the first control electrode has a plurality of openings.

5. The switchable 2D/3D display of claim 1, wherein the second black matrix is not disposed in the three dimensional image control area of the switchable barrier.

* * * * *